United States Patent

Petersen

[15] 3,673,671

[45] July 4, 1972

[54] METHOD OF FABRICATING WOOD TRUSSES

[72] Inventor: George R. Petersen, Kent, Wash.

[73] Assignee: P. H. Bowman Company, Inc., Seattle, Wash.

[22] Filed: Nov. 14, 1969

[21] Appl. No.: 876,625

[52] U.S. Cl...............................29/432.2, 29/526, 52/715, 287/20.92 L
[51] Int. Cl.......................................................B23p 11/00
[58] Field of Search................29/432.2, 432, 526; 227/152, 227/151; 52/715; 287/20.92 L

[56] References Cited

UNITED STATES PATENTS 2,771,608  11/1956  Mezger................................227/151
2,988,854  6/1961  McKinley.......................29/432.2 UX
3,255,943  6/1966  Sanford.................................227/152

Primary Examiner—Charlie T. Moon
Attorney—Christensen & Sanborn

[57] ABSTRACT

After the coplanar structural members of the truss assembly are arranged in end-adjacent array to form the necessary joints, a pair of toothed truss plates or the like is loosely applied to the sides of each joint; and a secondary fastener such as a clinch nail is impaled through the body of each member at each joint, and through the plates thereadjacent, so as to partially interlock the plates with the members in the plane of the assembly. So interlocked at the joints, the assembly is then passed in planar fashion through a roller press or the like, to flatten the plates against the sides of the joints, and to impale the teeth on the plates into the bodies of the structural members.

12 Claims, 6 Drawing Figures

PATENTED JUL 4 1972  3,673,671
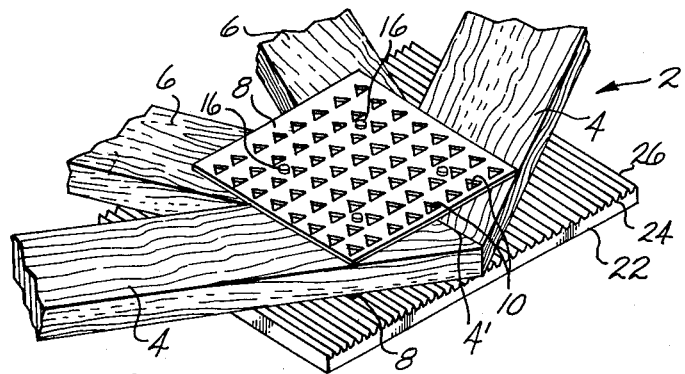
Fig. 1.
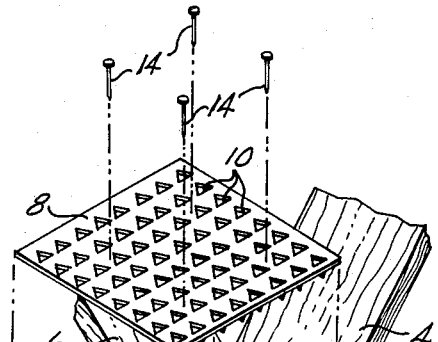
Fig. 2.
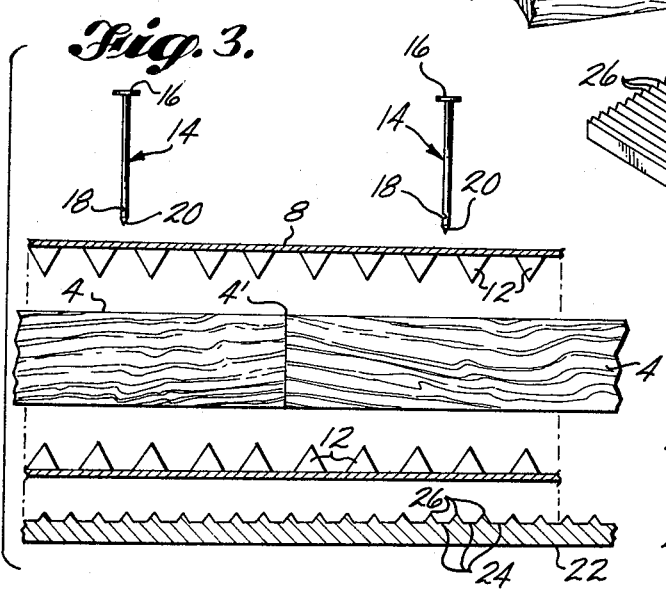
Fig. 3.
Fig. 4.
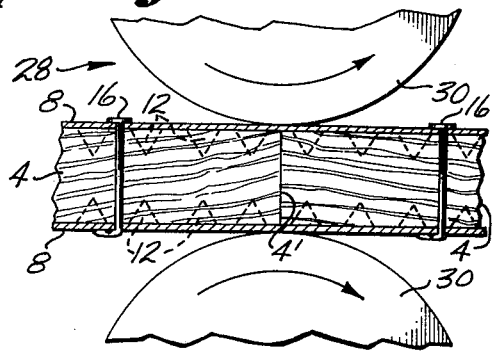
Fig. 6.
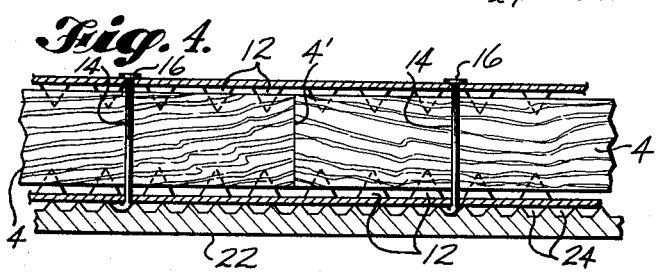
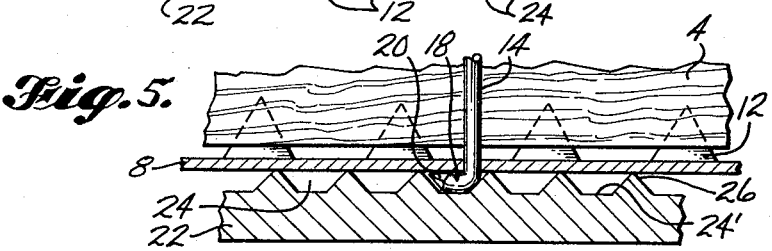
Fig. 5.
INVENTOR:
GEORGE R. PETERSEN
BY Christensen, Sanborn &
Matthews
ATTORNEYS

METHOD OF FABRICATING WOOD TRUSSES

FIELD OF THE INVENTION

This invention relates to an apparatus and technique for coupling wood joints, and more particularly, to an apparatus and technique for fabricating truss assemblies of coplanar structural members of wood or the like which are arranged in end-adjacent array to form a plurality of joints therebetween.

BACKGROUND OF THE INVENTION INCLUDING CERTAIN OBJECTS THEREOF

In the past, three principal techniques have been employed for fabricating truss assemblies of this type. One technique has involved the use of pre-punched sheet metal "truss plates" which have sharp angled teeth projecting to one side thereof at the points where the punch holes are formed. In the fabricating operation, a pair of such truss plates is used at each joint in the truss. One plate is applied on one side of each joint, and temporarily fastened to it by means of nails; and then after each joint is so equipped with a plate, the truss assembly is flipped over and the second plate is applied at each joint and likewise temporarily secured by nails. Finally, the entire assembly is passed through a roller press to flatten the plates against the sides of the joints, and to impale the teeth of the same into the bodies of the structural members. The result is to produce a rigid, well integrated assembly; however, the operation of inverting the truss is time consuming and laborsome, and in addition often risks a misalignment of the structural members in the process.

The second technique involves the use of a hydraulic squeeze device to apply the aforementioned pair of toothed truss plates to each joint without the necessity for inverting the truss. However, this technique is extremely costly and particularly in the initial capitalization stage in that a separate squeeze device, often costing ten thousand dollars or more, is needed at the location of each joint in the truss. The technique is also high in maintenance cost because of the hydraulic nature of the apparatus required.

The third technique also avoids the necessity for inverting the truss and involves the use of a pair of plain, flat, sheet metal plates for each joint, together with a number of so-called headed "clinch nails" which are impaled through the joint and the plates. The joint is interposed between the plates and rested on a flat, metal backup plate topped with a soft, woodfiber "clinch board." The clinch nails are then driven through the joint and sheet metal plates, and in turn against the backup plate which operates to bend the tips of the nails into the body of the clinch board, so as to "clinch" the sheet metal plates against the joint. See U.S. Pat. No. 2,988,854 in this connection, wherein it will be observed that the clinch board is normally stapled, glued or otherwise laminated with the lower sheet metal plate in each joint. Thus, while this technique is also effective in providing a serviceable assembly, it has the disadvantage that the clinch board laminate is a specialty item which is not capable of reuse, and which thus adds considerably to the cost of the assembly. Also a large number of nails is required in each joint, and not only do the nails add to the expense of the technique, but in addition, they cause the structural members to splinter and split, thus reducing the strength of the assembly.

One object of the present invention therefore is to provide an apparatus and technique for fabricating wood trusses which not only avoid the necessity for inverting the truss, but in addition, require relatively inexpensive equipment and materials to effect the operation. Another object is to provide an apparatus and technique of this nature wherein impalement fasteners are employed in the operation, but only in such limited numbers as to not affect the strength of the structural members. Still further objects will become apparent from the description of the invention which follows hereafter.

SUMMARY OF THE INVENTION

These objects and advantages are realized by an apparatus and technique of my invention wherein a pair of the foregoing toothed truss plates or the like are loosely applied to the sides of each joint in the truss assembly; and then the entire number of plates adjacent all of the joints in the assembly are flattened and impaled into the members by a single press with which the assembly undergoes relative motion during the press operation. In the meantime, in order to partially interlock the plates with the members, a headed clinch nail or other such secondary fastener is impaled through the body of each member at each joint, and through the plates thereadjacent, so as to partially interlock the plates with the members in the plane of the assembly. By using headed clinch nails, the plates and members are also interlocked crosswise of the assembly, as a result of the clinching effect derived from bending over the tips of the nails. The clinching operation may be carried out by applying the assembly against a hard surfaced but recessed backup member, the recess or recesses of which are adapted to deflect the tips of the nails against the outside face of the adjacent truss plate, as the tips pierce the plate and project into the recesses. Preferably, the surface of the backup member has a series of parallel grooves extending thereacross which are spaced apart by elongated ribs having line edge ridges and sloping sides thereon which terminate in the grooves at flat, horizontally disposed lands or valleys therein.

The press operation is facilitated by using a roller press or the like through which the assembly can be fed in "sheet fashion" by translating it in its own plane.

The coupling at each joint is characterized not only by the use of parallel, co-extensive truss plates thereon, but also by the presence of the impalement fasteners projecting therefrom, the bent over tips of which are openly exposed at the outer surface of one of the plates.

DESCRIPTION OF DRAWING

These features will be better understood by reference to the accompanying drawing wherein the invention is illustrated in connection with the peak joint of a standard roof truss.

In the drawing,

FIG. 1 is a part perspective view of the peak joint as it appears during the intermediate stage of the operation;

FIG. 2 is an exploded part perspective view of the partially coupled joint;

FIG. 3 is a cross-sectional view of the exploded representation in FIG. 1;

FIG. 4 is a cross-sectional view of the unexploded representation in FIG. 1;

FIG. 5 is a greatly enlarged part cross-sectional view of the clinching apparatus employed in FIGS. 1–4; and FIG. 6 is a part cross-sectional view of the press operation.

DESCRIPTION OF THE PREFERRED EMBODIMENT

Referring to the drawing, it will be seen that the peak or ridge joint 2 of the truss is formed by the upper chords or rafters 4 of the same which meet on the inclined profile of the truss, together with suitable diagonal bracing or struts 6. The rafters 4 and struts 6 are abutted and interengaged with one another in a common plane, and coupled together by means of a pair of sheet metal truss plates 8 which have the same rectangular dimensions and are disposed in co-extensive, spaced parallel relationship with one another to each side of the joint formed by the members 4, 6. The plates 8 have rows and columns of spaced, triangularly-shaped openings 10 punched therein, and the punched out material from the openings is upended in the lateral direction from the plates to form sharp pointed teeth 12 which project from the inside faces of the plates. The plates 8 are partially interlocked with the members by means of ordinary nails or clinch nails 14 of the type well-known in the art, each of which has a rounded head 16 and a notch 18 formed in the periphery thereof slightly above the pointed tip 20. The area of the plates 8 is sized to correspond to the general planar area of the joint 2, and a single nail 14 is employed across the joint for each structural member 4, 6 therein.

The joint 2 is fabricated and coupled with the assistance of a backup plate 22, the upper surface of which has a series of parallel grooves 24 extending thereacross. The grooves 24 are spaced apart by elongated flutes or ribs 26 having line edge ridges and sloping sides thereon. The sides terminate in the grooves at flat, horizontally disposed lands or valleys 24' formed therein.

In the fabricating and coupling operation, the mitered ends 4', etc., of the structural members 4, 6 are abutted against one another to form the joint, and the joint is held in position by means of a retaining jig (not shown) of the type commonly employed in the art. The backup plate 22 is positioned below the joint, and after one of the truss plates 8 is interposed between the backup plate and the joint, the truss plate and joint are rested on the ribs 26 of the plate. In this condition, the upstanding teeth 12 of the truss plate merely engage the opposing surface of the joint, and a slight clearance remains between the surface of the plate and the opposing surface of the joint. Likewise, when the second truss plate is rested on the upper surface of the joint, its downwardly extending teeth merely abut or engage the surface and a clearance remains below it as well.

At this stage, therefore, in order to temporarily secure the plates to the members, and to interlock the members in the plane of the joint, one of the clinch nails 14 is driven down through the plates 8 at a point over each member of the joint. As the tip 20 of the nail projects below the bottom plate, it enters the groove 24 which happens to register with it, and the shallow, inclined-wall configuration of the groove forces the tip to undergo a bend at the notch 18, thus reversing the tip against the adjacent surface of the lower truss plate. The effect is to clinch the plates and members together, and in turn to sink the teeth 12 of the plates more deeply into the surfaces of the joint. See FIGS. 4 and 5.

Assuming the plates and members at each joint in the truss are so integrated, the truss is ready for the press operation; and accordingly it is fed in the horizontal plane of the same through the nip of a roller press such as that illustrated at 28 in FIG. 6. The hard steel rollers 30 of the press operate to flatten the plates 8 against the joint, and to impale the teeth 12 of the plates into the bodies of the structural members. The rollers also operate to flatten the tips 20 of the nails still further against the lower plates. Although the tips remain openly exposed on the surface, this feature has been found to be in no way objectionable.

What is claimed is:

1. A method of fabricating a truss from coplanar structural members of wood or the like which are arranged in end-adjacent array with one another at a plurality of joints therebetween, comprising applying a pair of plates to the sides of each joint which have primary impalement fasteners raised on the applied faces thereof, temporarily coupling each joint by impaling a secondary fastener through the body of each structural member at each joint, and engaging each such secondary fastener with each of the plates adjacent said structural member, to partially interlock the plates with the members in and crosswise of the plane of the assembly, and thereafter moving the assembly and a press in relation to one another so as to flatten the plates against the sides of the joints, and to impale the raised fasteners on the plates into the bodies of the members to permanently couple the respective joints therebetween.

2. The method according to claim 1 wherein the array of members is maintained in the same relative earthly orientation while the secondary fasteners are engaged with the plates.

3. The method according to claim 1 wherein each secondary fastener is engaged with the plates adjacent the respective structural member, by impaling the same through and beyond the assembled plates and member while the assembly is abutted against a recessed backup surface adapted to deflect the tip of the secondary fastener as it extends beyond the assembly.

4. The method according to claim 3 wherein the secondary fastener is impaled through the assembly from one side of the respective joint, while the plate on the other side of the joint is abutted directly against the backup surface.

5. The method according to claim 1 wherein each secondary fastener is impaled through the plates adjacent the respective structural member, and bodily deformed to engage the same with the plates.

6. The method according to claim 5 wherein the secondary fasteners have heads thereon and are adapted to project beyond the opposite side of the assembly from which they are impaled, and the projecting tips of the headed fasteners are clinched against the assembly on the latter side thereof.

7. The method according to claim 6 wherein the projecting tips of the fasteners are clinched against the assembly simultaneously with the impalement thereof by applying the assembly against a recessed backup surface during the impalement operation, the recess of which is adapted to deflect the tips of the fasteners as they project.

8. The method according to claim 7 wherein the secondary fasteners take the form of headed clinch nails.

9. The method according to claim 1 wherein the plates are flattened against the sides of the joints by passing the assembly through a roller press.

10. The method according to claim 1 wherein the plates have punched holes therein, the material from which forms the raised impalement fasteners on the applied faces thereof.

11. In the process of coupling together a pair of coplanar structural members of wood or the like which are arranged to form a joint therebetween, the steps of applying a pair of plates to the sides of the joint which have primary impalement fasteners raised on the inside faces thereof, temporarily coupling the joint by impaling a secondary fastener through the body of each structural member, and through each plate adjacent said structural member, interengaging the secondary fasteners with the plates on the outside faces thereof, and clinching the plates against the members to partially interlock the plates with the members in and crosswise of the plane of the assembly, and thereafter moving the assembly in relation to a press, so as to flatten the plates against the sides of the joint and to impale the raised fasteners or the plates into the bodies of the members.

12. The process according to claim 11 wherein the secondary fasteners are impaled through the members and plates and simultaneously clinched against the outside faces of the plates by employing headed, extra length secondary fasteners and applying the assembly against a recessed backup surface during the impalement operation, the recess of which is adapted to deflect the tips of the fasteners as they project.

* * * * *

UNITED STATES PATENT OFFICE
CERTIFICATE OF CORRECTION

Patent No. 3,673,671                    Dated July 4, 1972

Inventor(s) George R. Petersen

It is certified that error appears in the above-identified patent and that said Letters Patent are hereby corrected as shown below:

Claim 11, line 54 "on" should be -- on --

Signed and sealed this 5th day of December 1972.

(SEAL)
Attest:

EDWARD M. FLETCHER, JR.
Attesting Officer

ROBERT GOTTSCHALK
Commissioner of Patents